United States Patent Office 2,798,112
Patented July 2, 1957

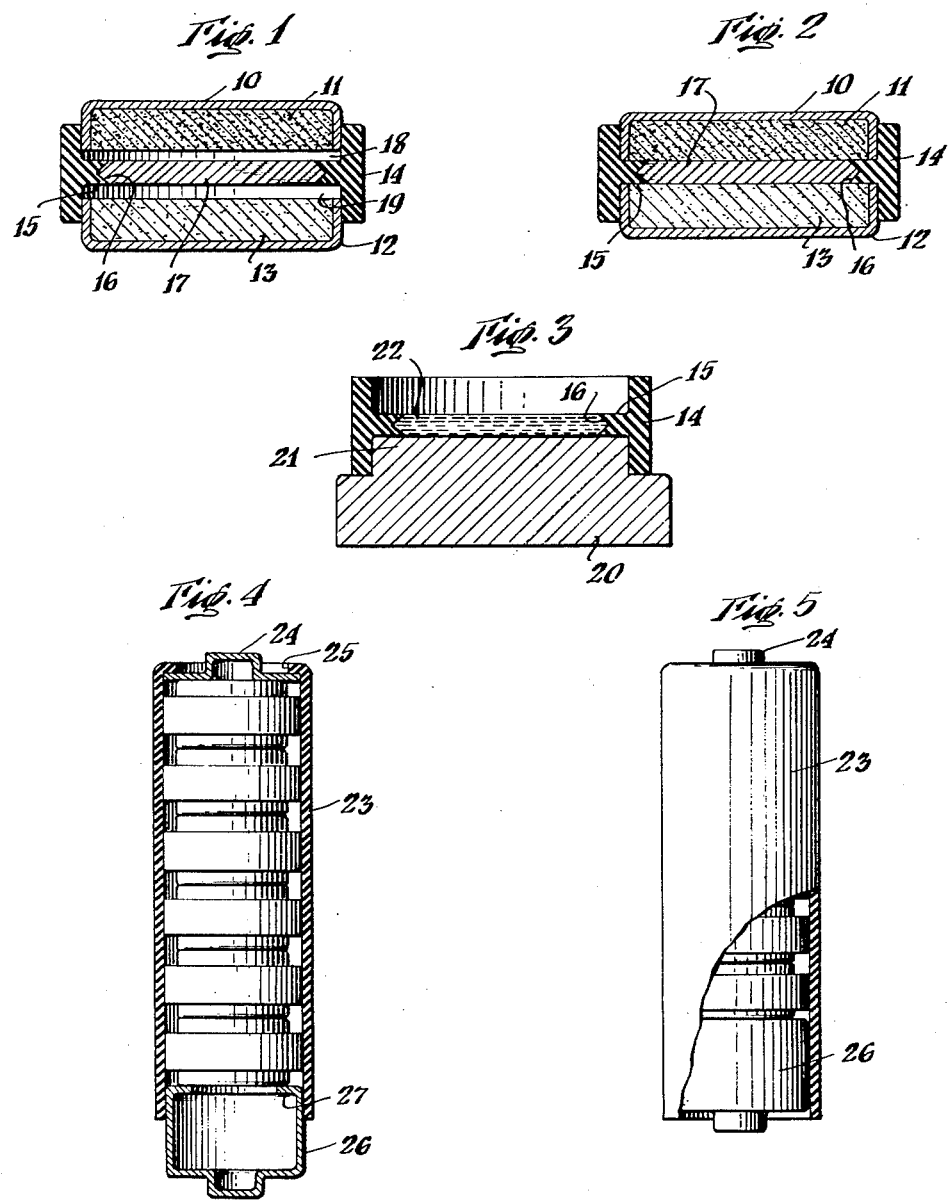

2,798,112
RESERVE TYPE DRY CELL

Samuel Ruben, New Rochelle, N. Y.

Application April 23, 1953, Serial No. 350,559

16 Claims. (Cl. 136—113)

This invention relates to reserve type dry cells and, more particularly, to a reserve-type battery comprising a plurality of serially connected cells which are normally in the inactive condition but may be readily activated without the addition of an electrolyte or individual treatment of the several cells.

As is known, conventional dry cells cannot be stored for long periods of time without deterioration as even in the absence of any current drain a slow reaction takes place between the electrodes and the electrolyte contained in the cell which, after a shorter or longer storage-period, will cause complete deterioration of the cell. Since there are many practical applications, such as particularly military applications, where it is necessary to maintain the completed cells in storage for several years, various proposals were made in the past to eliminate this difficulty. Conventional reserve type cells designed to overcome the difficulty are generally based on one of two principles. Some of these reserve type cells comprise structures which are complete as to cathode and anode but are in a completely dry condition and contain no electrolyte. When it is desired to activate the cell, a suitable liquid electrolyte is forced into the space between the cathode and anode thereby to render the cell structure operative or active. Other cells of the reserve type, in addition to the cathode and the anode, also include the proper amount of electrolyte which, however, is normally separated from the electrodes by a diaphragm or is in a separate sealed compartment within the cell. In this case the cell is activated by perforating or puncturing the diaphragm or compartment containing the liquid electrolyte which is supplied to a suitable wick of porous material, such as absorbent paper or cotton. The wick distributes the electrolyte into the proper cooperating position with respect to the electrodes. While these conventional reserve type cells have been used to a minor extent in the past, considerable difficulties were experienced particularly when it was desired to combine a number of such cells into a battery. In that case it was difficult to activate all of the cells simultaneously by impregnation or immersion into the electrolyte without at the same time producing external electrical leakage paths. For this reason such prior series activated batteries were suitable only for such applications where merely service for short periods of time was required and where external electrical leakage between the cells was not an important factor. Although various other suggestions and proposals were made to solve the outstanding problem and to provide a satisfactory reserve type dry cell, also suitable for series connection, none, as far as I am aware, of these suggestions and proposals were completely satisfactory and successful.

I have discovered a simple and completely satisfactory solution of the outstanding problem.

It is an object of the present invention to improve dry cells of the reserve type.

It is another object of the present invention to provide a novel and improved reserve type dry cell, a plurality of which may be readily connected in series and which may be activated at a moment's notice without developing any external leakage paths.

It is also within the contemplation of the invention to provide a novel reserve type dry cell or battery which may be stored for extremely long periods of time without any appreciable deterioration and which may be activated at any time without addition of any electrolyte simply by mechanical displacement of some of the cell elements.

The invention also contemplates a reserve type dry cell and battery which is simple in construction, capable of storage for several years without deterioration, and which may be readily manufactured on a practical and industrial scale at a low cost.

Other and further objects and advantages of the present invention will become apparent from the following description, taken in conjunction with the accompanying drawing, in which:

Fig. 1 is a vertical sectional view of a reserve type dry cell embodying the invention, in the inoperative or inactive condition of the cell;

Fig. 2 is a similar view of the cell shown in Fig. 1, in its operative or activated condition;

Fig. 3 is a sectional view, somewhat diagrammatic and fragmentary in character, illustrating a method by which the solid electrolyte body suitable for the cells of the invention may be prepared;

Fig. 4 is a side elevational view, having parts in section, of a battery of serially connected reserve type dry cells in their inoperative or inactive condition; and Fig. 5 is a view similar to Fig. 4 showing the battery in its activated condition.

Broadly stated, in accordance with my invention, I provide a dry cell which is free from mobile or free flowing electrolyte and is characterized by an electrolyte in the form of a generally solid body. Electrolyte bodies of the desired character may be produced by combining the liquid electrolyte with a suitable immobilizing or gelling agent. The solid electrolyte body is maintained normally separated from the active electrode surfaces but is capable of being brought into cooperating and contacting relation therewith by mechanical displacement of the active elements or electrodes towards the electrolyte body. A mechanical member, which may be in the form of a sleeve or grommet formed of elastic insulating material, serves for supporting the solidified or gelled electrolyte in spaced relation with respect to the electrodes and is also effective in sealing the electrolyte from the exterior.

The broad concept of the mechanically activated reserve type dry cell of the invention may be applied to a great variety of electro-chemical cell systems, one example of which is the alkaline type cell. Such a cell utilizes a depolarizer of the oxide type, such as an oxide of manganese, silver, copper, lead, or mercury, with or without the addition of graphite for the purpose of rendering the depolarizer pellet more conductive.

Generally speaking, all of the cells embodying the invention are characterized by the same basic structure regardless of the electro-chemical system used. A preferred practical form of the cell of the invention comprises a metal container or terminal shell having a pellet of depolarizer material compressed of consolidated therein, a container or shell having a pellet of anodic material consolidated therein, and a plastic element supporting the solid or gel electrolyte in spaced position with respect to the active surfaces of cathode and anode and also defining a sealed enclosure for the cell in combination with the said containers. When in the inactive or reserve position, the cathode and anode are separated from the solid electrolyte by an air space and, when activated, the cathode and anode containers are pressed together and the active cell materials are brought into contact with the electrolyte. The circumferential walls of the containers and of the electrolyte support of plastic material are arranged in a relatively tight fit so as to prevent entrance of air or other gases or vapors into the cell. The vapor pressure of the gel electrolyte used, having a high alkaline concentration, is low enough to prevent undue moisture vapor effects on the anode in the inactive condition of the cell.

Referring now more particularly to Fig. 1 or the drawing, reference numeral 10 denotes an open-ended container or terminal shell of nickel-plated steel having a compressed pellet 11 of a suitable depolarizer consolidated therein. This depolarizer may be composed, for example, of mercuric oxide intimately mixed with 5% of micronized graphite to increase its electrical conductivity. Opposite to cathode container 10, there is provided an anode container 12 of similar shape formed of tinned steel having a body 13 of anodic material compressed therein. This anodic material may be a consolidated disc of amalgam powder containing about 15% mercury.

Containers 10 and 12 have their marginal regions encircled by means of a cylindrical sleeve 14 which is preferably made of an elastic insulating material having good resistance to strong alkalis, such as polyethylene. Sleeve or grommet 14 is provided with an inwardly extending flange 15 having a generally V-shaped groove 16 therein which supports a layer of tough solid electrolyte gel 17. Electrolyte gel body 17 may comprise an hydroxide electrolyte, such a potassium hydroxide, which is converted into a form-retaining or solid gel by heating it with a minor addition of a suitable gelling agent, such as sodium carboxy-methyl cellulose. It will be noted that in the initial or inactive condition of the cell illustrated in Fig. 1, there is a small air space 18 and 19 between the electrolyte disc 17 and cathode 11 and anode 13, respectively. As the inner surface of the plastic sleeve or grommet 14 forms a tight friction fit with the corresponding surfaces of containers 10 and 12, a substantially air-tight enclosure is provided which prevents the entrance of external gases or vapors into the cell.

When it is desired to activate the cell of the invention, axial pressure is applied to containers 10 and 12. This pressure will displace the containers and the active cathode and anode materials therein until the exposed surfaces of such materials are brought into cooperating and contacting position with the corresponding faces of electrolyte layer or body 17. This simple mechanical operation will instantaneously activate the cell which is now ready to deliver current, the external surfaces of containers 10 and 12 serving as terminals of the cell. Any residual air that is present within the cell in its inactive condition may readily escape between the plastic sleeve 14 and the side walls of containers 10 and 12. Flange 15 of the sleeve is also effective as a stop which prevents excessive compression of electrolyte body 17 during activation of the cell.

The electrolyte body forming part of the cell of the invention may be prepared in various different ways one of which will be explained in connection with Fig. 3. It will be noted that plastic sleeve 14, having an internal flange 15 integrally formed therewith, is placed upon a cylindrical base 20 formed of a suitable alkali-resistant material in such a position that reduced diameter portion 21 of base 20 engages the lower portion of the sleeve and defines with flange 15 of the sleeve a storage space 22 for the electrolyte. Into this space 22 is poured a mixture comprising a 50% solution of potassium hydroxide, containing about 4% of sodium carboxy-methyl cellulose. This solution is heated to a temperature of about 120° C. and the hot solution is poured into space 22 to fill out such space up to the level of flange 15. Upon cooling, the hot electrolyte solution will be converted into a generally solid tough and flexible disc of gelled electrolyte. In order to provide a positive and permanent bond between the electrolyte disc and flange 15 of the sleeve, the said sleeve has a V-shaped notch or groove 16 provided therein. The finished cooled and solidified electrolyte disc attached to sleeve 14 may now be removed from base 20 and may be assembled with the cathode and anode containers into a complete cell.

The alkali metal salts of carboxy-methyl cellulose, particularly sodium carboxy-methyl cellulose, are the preferred gelling agents where an alkaline electrolyte is used. There are, however, other gelling agents which are suitable for the purposes of the invention, such as starches or polyvinyl alcohol, although none of these materials provide the dimensional stability or ease of casting the electrolyte gel into a fixed space such as are obtainable by carboxy-methyl cellulose. In other cell systems using chloride electrolytes in combination with a magnesium anode, chloride gels of starch may be used.

In order to improve the strength of the alkaline gel comprising carboxy-methyl cellulose, magnesium hydroxide may be suspended in the gel while it is still in the liquid state. This addition will mechanically strengthen the cast gel and also reduces any tendency to produce free liquid under storage conditions. Other alkali-insoluble non-conductive additions may be used for the same purpose, such as magnesium oxide or calcium oxide.

The reserve type cells of the invention may advantageously be combined into batteries, one of the preferred forms of such battery being shown in Fig. 4 of the drawing. It will be noted that the battery comprises a stack or plurality of cells of the type shown in Fig. 1 superimposed upon one another whereby the said cells are connected in series.

The stack of cells is surrounded by a plastice tube 23 formed of Tenite or styrene and at the top of the stack there is provided a top-terminal disc 24 which makes contact with one container of the top cell and constitutes one of the terminals of the battery. Top terminal 24 is retained in its assembled position by crimping down the top edge of pastic tube 23 as indicated at 25. In contact with the lowermost cell is a nickel-plated steel cup 26, constituting the other terminal of the battery. The open end of cup 26 is inwardly turned at 27 to provide a surface which is in positive engagement or pressure contact with one container of the lowermost cell. Cup 26 extends a distance beyond the lower end of the tube 23 with which it forms a tight fit and in which it is displaceable as a plunger. It is to be observed that in the illustrated position of the battery all of the individual cells of the stack are in their inactive position depicted in Fig. 1. In other words, in each cell the cathode and anode materials are separated by a small air space from the interposed gelled electrolyte disc.

To activate the battery, cup 26 is pressed up into plastic tube 23 and forces all of the cell elements to come into contact with the respective interposed gel electrolyte body thereby eliminating the air space that originally existed between the gel and the electrodes. Thus, all of the cells are simultaneously activated and as the several cells of the stack are in pressure contact and serially connected with each other, the battery is ready for connection to an external circuit, using top disc 24 and bottom cup 26 as terminals. This operative condition of the cell is illustrated in Fig. 5.

The parts of the cell and the entire battery are kept within close tolerances so that a reasonably air-tight structure is provided. This structure, however, is capable of venting the air present in the inactive condition of the cell upon activation or compression of the cell elements and also to release any small amounts of gas that may be generated during actual operation of the cell. On the other hand, the structure is sufficiently air-tight to prevent the entrance of air, moisture, or any reactive gas such as $CO_2$ into the interior of the cells.

Although the present invention has been disclosed in connection with preferred embodiments thereof, variations and modifications may be resorted to by those skilled in the art without departing from the principles of the invention. I consider all of these variations and modifications to be within the true spirit and scope of the present invention, as disclosed in the foregoing description and defined by the appended claims.

I claim:

1. An electrical current producing cell comprising, in combination, a pair of terminals, cathode and anode materials respectively associated with said terminals, a substantially solid electrolyte body interposed between said materials, and means to which said electrolyte body is permanently attached for holding said materials in spaced position with respect to the electrolyte body while capable of displacement into contacting position with said body thereby to activate said cell, said means also cooperating with said terminals to constitute therewith a sealed enclosure for the cell both prior and after activation of said cell.

2. An electrical current producing cell of the reserve type comprising, in combination, a pair of open-ended containers faced into each other, cathode and anode materials respectively provided in said containers, a substantially solid electrolyte body interposed between the exposed surfaces of said materials, and a member encircling the marginal regions of said containers and constituting therewith a sealed enclosure for the cell both prior and after activation thereof, said member having said electrolyte body circumferentially attached thereto and normally holding the containers in a position in which the active materials are out-of-contact with the electrolyte body while capable of displacement into contacting position with said body to activate the cell.

3. A reserve type dry cell comprising, in combination, a pair of metal terminal shells faced into each other, cathode and anode materials respectively provided in said shells, an electrolyte body of substantially solid consistency interposed between the exposed surfaces of said materials, and a sleeve encircling the marginal regions of said shells and constituting therewith a sealed enclosure for the cell both prior and after activation thereof, said sleeve including means to which said electrolyte body is circumferentially attached for spacedly supporting the electrolyte body from the cell materials whereby the cell is initially maintained in an inoperative condition but becomes activated upon displacement of the terminal shells into a position wherein the cell materials are in contact with the electrolyte body.

4. A reserve type dry cell comprising, in combination, a pair of terminal shells faced into each other and respectively having cathode and anode materials therein, a layer of substantially solid electrolyte interposed between the exposed surfaces of said materials, and a sleeve of elastic insulating material frictionally engaging the marginal regions of said shells and constituting therewith a sealed enclosure for the cell both prior and after activation thereof, said sleeve including an internally extending portion to which said electrolyte layer is circumferentially attached for spacedly supporting the electrolyte layer from the cell materials whereby the cell is initially maintained in an inoperative condition but is capable of being activated upon axial displacement of the terminal shells into a position wherein the cell materials are in contact with the electrolyte layer.

5. A reserve type dry cell comprising, in combination, a pair of cylindrical terminal shells faced into each other and respectively having a depolarizer and an anode material consolidated therein, a form-retaining disc of electrolyte gel between the exposed surfaces of said materials, and a cylindrical sleeve of elastic insulating material having a tight friction fit with the marginal regions of said shells and constituting therewith a sealed enclosure for the cell both prior and after activation thereof, said sleeve including an internally extending flange to which said electrolyte gel disc is attached for spacedly supporting the said gel disc from the cell materials in the inactive condition of the cell, said shells being capable of axial displacement towards each other to bring the cell materials into contact with the gel disc thereby to activate the cell.

6. A reserve type dry cell comprising, in combination, a pair of cylindrical terminal shells faced into each other and respectively having a depolarizer and an anode material compressed therein, a disc of electrolyte gel between the exposed surfaces of said materials, and a cylindrical sleeve of insulating material having a sliding air-excluding friction fit with the marginal regions of said shells and including an internally extending flange to which said electrolyte gel disc is circumferentially attached for spacedly supporting the gel disc from the cell materials in the inactive condition of the cell, said shells being capable of axial displacement towards each other limited by the thickness of said flange to bring the cell materials into contact with the gel disc thereby to activate the cell.

7. The cell claimed in claim 6 wherein the flange of the insulating sleeve is internally grooved to hold the gel electrolyte disc in permanent engagement.

8. A reserve type dry cell comprising, in combination, a pair of terminal shells faced into each other, a depolarizer cathode composed of a major proportion of mercuric oxide and a minor proportion of graphite compressed in one of said shells, an anode composed of amalgamated zinc powder compressed in the other of said shells, a disc of alkaline electrolyte gel between the exposed surfaces of said cathode and anode materials, and a sleeve of elastic insulating material having an air-excluding friction fit with the marginal regions of said shells and having an internal surface portion to which said electrolyte gel disc is circumferentially attached for spacedly supporting said gel disc from the cathode and anode material in the inactive condition of the cell, said shells being capable of axial displacement towards each other to bring the cathode and anode materials into contact with the gel disc thereby to activate the cell.

9. The cell claimed in claim 8 wherein the alkaline electrolyte is potassium hydroxide and is gelled by an addition of sodium carboxy-methyl cellulose.

10. A reserve type battery comprising, in combination, a tube of insulating material; a stack of reserve type cells in said tube; each of said cells comprising a cathode and an anode with an electrolyte body interposed therebetween, and means to which said electrolyte body is attached for holding said cathode and anode in spaced position with respect to the electrolyte body while capable of displacement into cooperating and contacting position with said body thereby to activate said cell; and means operatively associated with said tube adapted when actuated to apply axial pressure upon the stack thereby to cause simultaneous activation of all of the cells.

11. A reserve type battery comprising, in combination, a tube of insulating material; a stack of serially connected reserve type dry cells superimposed upon one another in said tube; each of said cells comprising cathode and anode containers with active electrode materials therein and a layer of solid electrolyte therebetween, and a sleeve to which said electrolyte layer is circumferentially attached encircling marginal regions of the containers and normally spacedly supporting the electrode materials from the electrolyte layer but capable of axial displacement into contacting position therewith to activate the cell; a top terminal in one end of said tube in contact with the top container of the uppermost cell; and a metal piston member slideably and frictionally held in the other end of said tube in contact with the bottom container of the lowermost cell adapted to be displaced to apply axial pressure upon the stack thereby to cause simultaneous activation of all of the cells; said piston member also constituting the bottom terminal of the battery.

12. In combination with a reserve type cell having open ended cathode and anode shells with active cell materials therein, an electrolyte disc of generally solid consistency, and an insulative sleeve having an internal surface to which said electrolyte disc is circumferentially attached encircling and supporting said electrolyte disc, said seleve being adapted to form at its two ends a tight air-excluding friction fit with the open ends of said cathode and anode shells, respectively.

13. In combination with a reserve type cell comprising open-ended cathode and anode shells with active cell materials therein, a solid electrolyte disc composed of an electrolyte and of a compatible gelling agent, and a sleeve of elastic insulating material having an internal surface into which the edge of said electrolyte disc is circumferentially embedded for positive support, said sleeve being adapted to form at its two ends a tight friction fit with the open ends of said cathode and anode shells, respectively.

14. The combination claimed in claim 13, wherein the electrolyte gel also contains particles of an inert, alkali-insoluble, non-conducting material to improve the mechanical strength and dimensional stability of the solid electrolyte disc.

15. The combination claimed in claim 13, wherein the electrolyte gel has particles of magnesium hydroxide suspended therein.

16. The method of making a mounted solid electrolyte disc which comprises providing an elastic insulative sleeve having an inwardly extending grooved flange, placing said sleeve upon a solid base of inert material thereby closing up the bottom opening of said sleeve and defining a casting space, pouring gellable hot electrolyte liquid into said casting space, allowing said liquid to cool and to consolidate into a solid gel, and then removing said sleeve with the electrolyte disc bonded thereto from said base.

References Cited in the file of this patent
UNITED STATES PATENTS

| | | |
|---|---|---|
| 1,086,437 | Broad | Feb. 10, 1914 |
| 1,432,025 | Hoppie | Oct. 17, 1922 |
| 2,499,239 | Williams | Feb. 28, 1950 |
| 2,580,415 | Ellis | Jan. 1, 1952 |
| 2,582,973 | Ellis | Jan. 22, 1952 |
| 2,590,824 | Roehrl | Mar. 25, 1952 |